(12) United States Patent
He

(10) Patent No.: US 11,435,725 B2
(45) Date of Patent: Sep. 6, 2022

(54) LOOKUP TABLE CREATION METHOD, DISPLAY PANEL MANUFACTURING METHOD, AND DISPLAY DEVICE

(71) Applicant: HKC CORPORATION LIMITED, Shenzhen (CN)

(72) Inventor: Huai Liang He, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 896 days.

(21) Appl. No.: 16/320,490

(22) PCT Filed: Nov. 7, 2018

(86) PCT No.: PCT/CN2018/114273
§ 371 (c)(1),
(2) Date: Jan. 25, 2019

(87) PCT Pub. No.: WO2020/073397
PCT Pub. Date: Apr. 16, 2020

(65) Prior Publication Data
US 2021/0373534 A1  Dec. 2, 2021

(30) Foreign Application Priority Data
Oct. 8, 2018  (CN) .......................... 201811168119.4

(51) Int. Cl.
| G05B 19/418 | (2006.01) |
| G02F 1/1341 | (2006.01) |
| G02F 1/1333 | (2006.01) |
| G02F 1/1335 | (2006.01) |

(52) U.S. Cl.
CPC ..... *G05B 19/4183* (2013.01); *G02F 1/13415* (2021.01); *G02F 1/133354* (2021.01); *G02F 1/133512* (2013.01); *G02F 1/133516* (2013.01); *G05B 2219/35172* (2013.01); *G05B 2219/45031* (2013.01)

(58) Field of Classification Search
CPC ...... G05B 19/4183; G05B 2219/35172; G02F 1/1303; G02F 1/1333; G02F 1/13415
See application file for complete search history.

(56) References Cited

U.S. PATENT DOCUMENTS

2018/0148531 A1 * 5/2018 Tamatani ............ G02F 1/13394

FOREIGN PATENT DOCUMENTS

| CN | 2003330030 A | 11/2003 |
| CN | 105700225 A | 6/2016 |
| CN | 105807503 A | 7/2016 |
| CN | 106988282 A | 7/2017 |
| CN | 107045215 A | 8/2017 |
| JP | 2006058736 A | 3/2006 |

OTHER PUBLICATIONS

Zijiang Yu, the ISA written comments, Jul. 2019, CN.

* cited by examiner

*Primary Examiner* — Jessica M Merlin

(57) ABSTRACT

This application discloses a lookup table creation method, a display panel manufacturing method, and a display device. The lookup table creation method includes: forming different photoresist layers; baking the photoresist layers; measuring the film thicknesses of the photoresist layers to acquire a curve chart of film thickness varying with time; and creating a lookup table according to the curve chart.

15 Claims, 6 Drawing Sheets

LOOKUP TABLE CREATION METHOD, DISPLAY PANEL MANUFACTURING METHOD, AND DISPLAY DEVICE

This application claims priority to Chinese Patent Application No. CN201811168119.4, filed with the Chinese Patent Office on Oct. 8, 2018 and entitled "LOOKUP TABLE CREATION METHOD, DISPLAY PANEL MANUFACTURING METHOD, AND DISPLAY DEVICE", which is incorporated herein by reference in its entirety.

TECHNICAL FIELD

This application relates to the field of display technologies, and more particularly relates to a lookup table creation method, a display panel manufacturing method, and a display device.

BACKGROUND

The description herein provides only background information related to this application, but does not necessarily constitute the existing technology. Displays in the market are generally controlled on the basis of active switches, are widely applied due to many advantages such as thin machine body, power saving, no radiation and the like, and mainly include a liquid crystal display, an organic light-emitting diode (OLED) display, a quantum dot light emitting diode (QLED) display, a plasma display and the like. According to appearance structures, there are both planar displays and curved displays.

A display technology is improving constantly, but there are also some problems. For example, a display panel often has a bubble or chromatic aberration problem, and the color saturation or the penetration rate of the panel may not meet the requirement.

SUMMARY

In view of the above-mentioned shortcomings, this application provides a lookup table creation method, a display panel manufacturing method and a display device.

To achieve the above-mentioned objectives, this application provides a lookup table creation method, the creation method including:

correspondingly and respectively forming different types of single-layer photoresist layers on multiple mother glass substrates;

baking the photoresist layers on the mother glass substrates at preset temperature;

measuring a film thickness of each photoresist layer after a preset time interval to acquire a curve chart of the film thickness varying with baking time of the photoresist layer; and fitting and correcting the curve chart to create a lookup table.

Optionally, the preset time includes a first preset time and a second preset time, and a method for measuring a film thickness of each photoresist layer after a preset time interval to acquire a curve chart of the film thickness varying with baking time of the photoresist layer includes:

baking each photoresist layer in a baking oven for the first preset time;

after cooling, measuring the film thickness of the photoresist layer;

putting the photoresist layer into the baking oven for baking after the measurement is completed;

measuring the film thickness of the photoresist layer once every second preset time; and acquiring the curve chart of the film thickness varying with the baking time of the photoresist layer.

Optionally, the first preset time is equal to the baking time of the photoresist layer in a manufacture procedure of a display panel, the first preset time is between 20 min and 60 min, and the second preset time is longer than 3 min.

Optionally, a method for correspondingly and respectively forming different types of single-layer photoresist layers on multiple mother glass substrates includes:

respectively coating the multiple mother glass substrates with different types of single-layer photoresist material layers; and performing a mask manufacture procedure on the photoresist material layers by adopting a corresponding preset mask to form the photoresist layers.

Optionally, the preset mask is the same one as that for the photoresist layers in the manufacture procedure of the display panel.

Optionally, the preset temperature is equal to the baking temperature of the photoresist layers in the manufacture procedure of the display panel. The preset temperature is between 220° C. and 260° C.

Optionally, the photoresist layers include a black matrix photoresist layer, a red photoresist layer, a green photoresist layer, a blue photoresist layer, a white photoresist layer and a spacer unit photoresist layer.

This application further discloses a display panel manufacturing method, which adopts the above-mentioned created lookup table, the method including:

forming a first substrate provided with different types of photoresist layers on a glass substrate by adopting different mask manufacture procedures;

acquiring a setting order and baking time of the different types of photoresist layers;

calculating a box thickness of a display panel according to the setting order and the baking time;

controlling a drop-in volume of liquid crystals according to the box thickness; and aligning the first substrate with a second substrate to form the display panel.

Optionally, a method for calculating a box thickness of a display panel according to the setting order and the baking time includes:

calculating total baking time of each photoresist layer according to the setting order and the baking time;

correspondingly inquiring the lookup table according to the total baking time of each photoresist layer to acquire a film thickness of each photoresist layer;
and calculating the box thickness of the display panel according to the film thickness of each photoresist layer.

This application further discloses a display device, including a control component, and a display panel produced by adopting the above-mentioned method of controlling the liquid crystal volume.

Compared with such a solution that color layers on a color filter (CF) substrate may have film shrinkage to a certain extent after being subjected to back manufacture procedures for multiple times, which causes a difference in the volumes of subsequently dropped liquid crystals and leads to bubbles or chromatic aberration of the panel, this application respectively forms the different types of single-layer photoresist layers on multiple mother glass substrates to facilitate accurate calculation of the film thickness after baking, bakes each photoresist layer on each mother glass substrate at a preset temperature, ensures that each photoresist layer is baked within same time to guarantee the accurate calculation of the film thickness, measures the film thickness of the photoresist layer after a preset tune interval to acquire a curve chart of the film thickness varying with the baking time of the photoresist layer, fits and corrects the curve chart to create a lookup table, effectively finds out a variation of the film thickness of the substrate according to the lookup table, and then calculates the box thickness of the display panel to correspondingly calculate the drop-in volume of the liquid crystals, thus solving the bubble or chromatic aberration problem of the display panel.

BRIEF DESCRIPTION OF DRAWINGS

The accompanying drawings included are used for helping understand the embodiments of this application, constitute a part of this specification, illustrate examples of the embodiments of this application and, together with the description, serve to explain the principles of this application. Apparently, the accompanying drawings in the following description merely show some embodiments of this application, and persons of ordinary skill in the art may still derive other drawings from these accompanying drawings without creative effort. In the figures.

DETAILED DESCRIPTION

Figure 1:
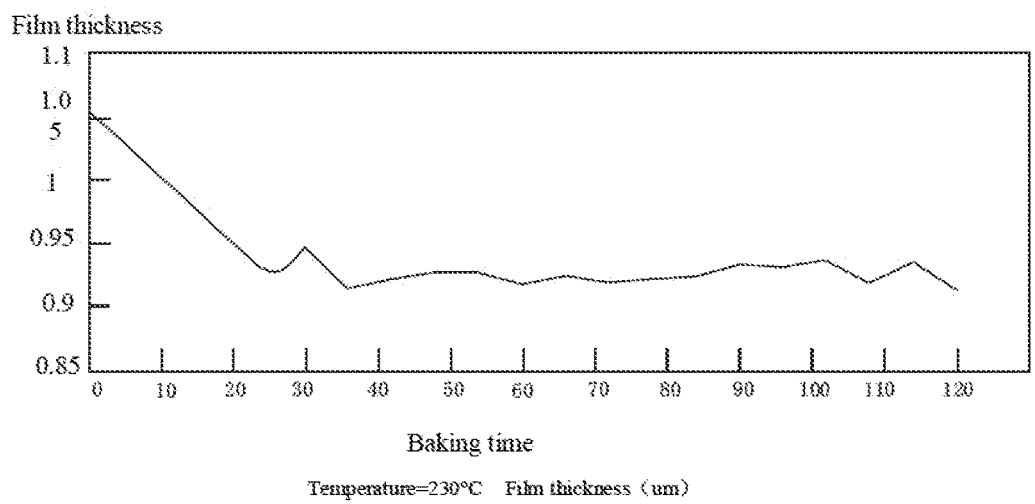
FIG. 1 is a curve chart between baking time and a film thickness of a black matrix photoresist layer according to an embodiment of this application.

Specific strictures and functional details disclosed herein are merely representative, and are intended to describe the objectives of the exemplary embodiments of this application. However, this application may be specifically implemented in many alternative forms, and should not be construed as being limited to the embodiments set forth herein.

In the description of this application, it should be understood that orientation or position relationships indicated by the terms such as "center", "transverse", "below", "left", "right", "vertical", "horizontal", "top", "bottom", transverse, on, "inside", and "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application. In addition, the terms such as "first" and "second" are used only for the purpose of description, and should not be understood as indicating or implying the relative importance or implicitly specifying the number of the indicated technical features. Therefore, a feature defined by "first" or "second" can explicitly or implicitly include one or more of said features. In the description of this application, unless otherwise stated, "a plurality of" means two or more than two. In addition, the terms "include", "comprise" and any variant thereof are intended to cover non-exclusive inclusion.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through au intermediary, or internal communication between two components. Persons of ordinary skill in the art may understand the specific meanings of the foregoing terms in this application according to specific situations.

The terminology used herein is for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, operations, elements, and/or components, but do not preclude the presence or addition of one or more other features, integers, steps, operations, elements, components, and/or combinations thereof.

This application is further described below with reference to the accompanying drawings and embodiments.

Figure 2:
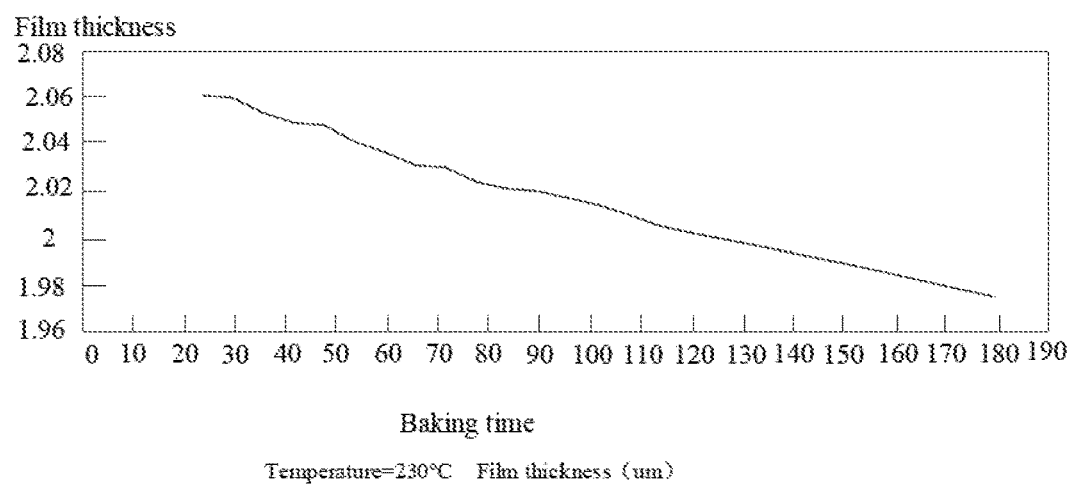
FIG. 2 is a curve chart between a film thickness and baking time of a red photoresist layer according to au embodiment of this application.
Figure 3:
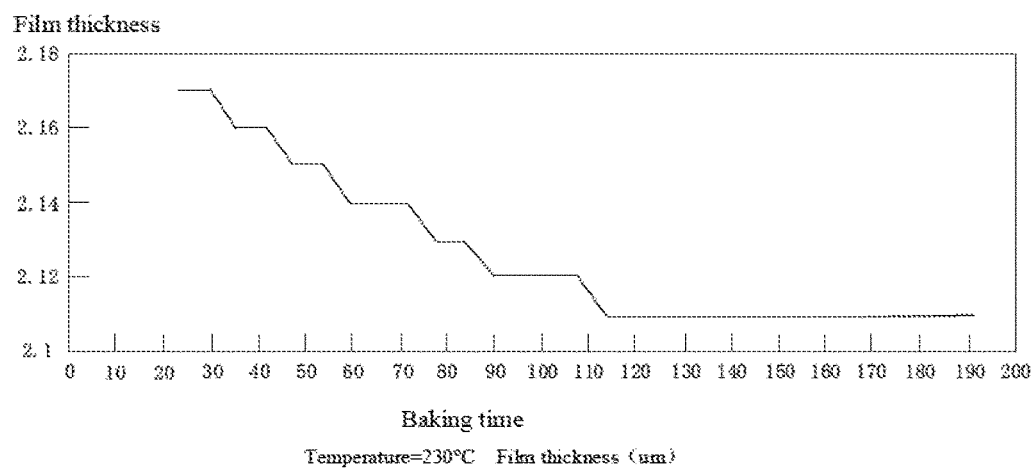
FIG. 3 is a curve chart between a film thickness and baking time of a green photoresist layer according to an embodiment of this application.
Figure 4:
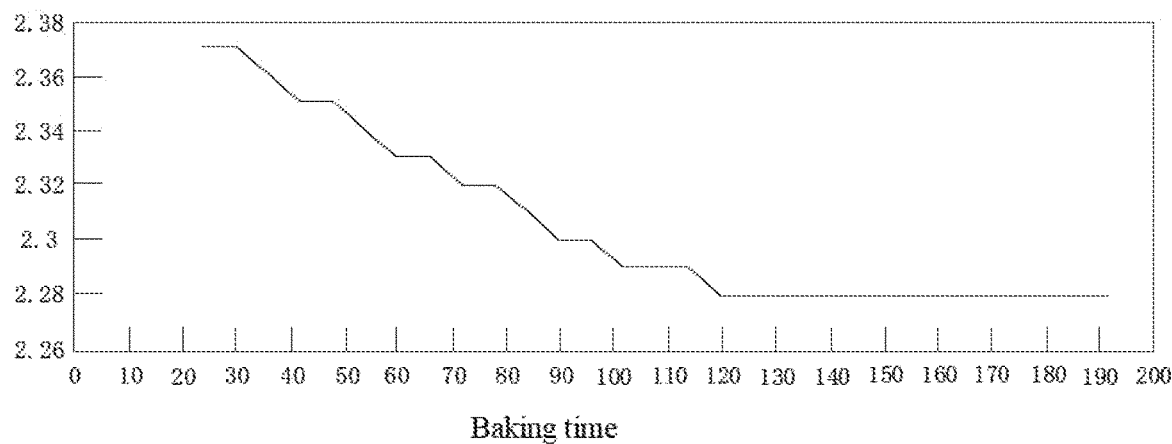
FIG. 4 is a curve chart between a film thickness and baking time of a blue photoresist layer according to an embodiment of this application.
Figure 5:
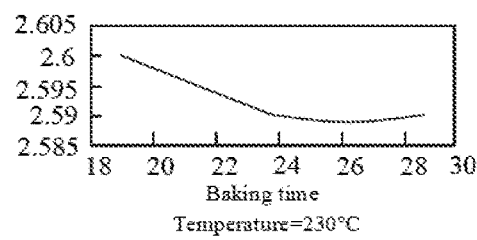
FIG. 5 is a curve chart between various physical properties and baking time of a spacer unit photoresist layer according to an embodiment of this application.
Figure 5:
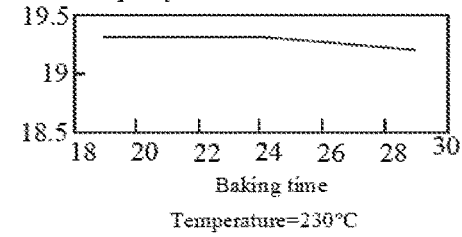
Figure 5:
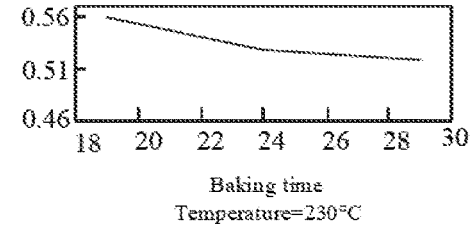
Figure 5:
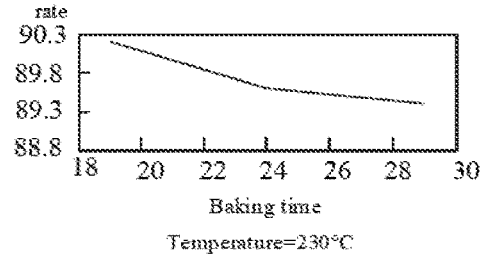
Figure 6:
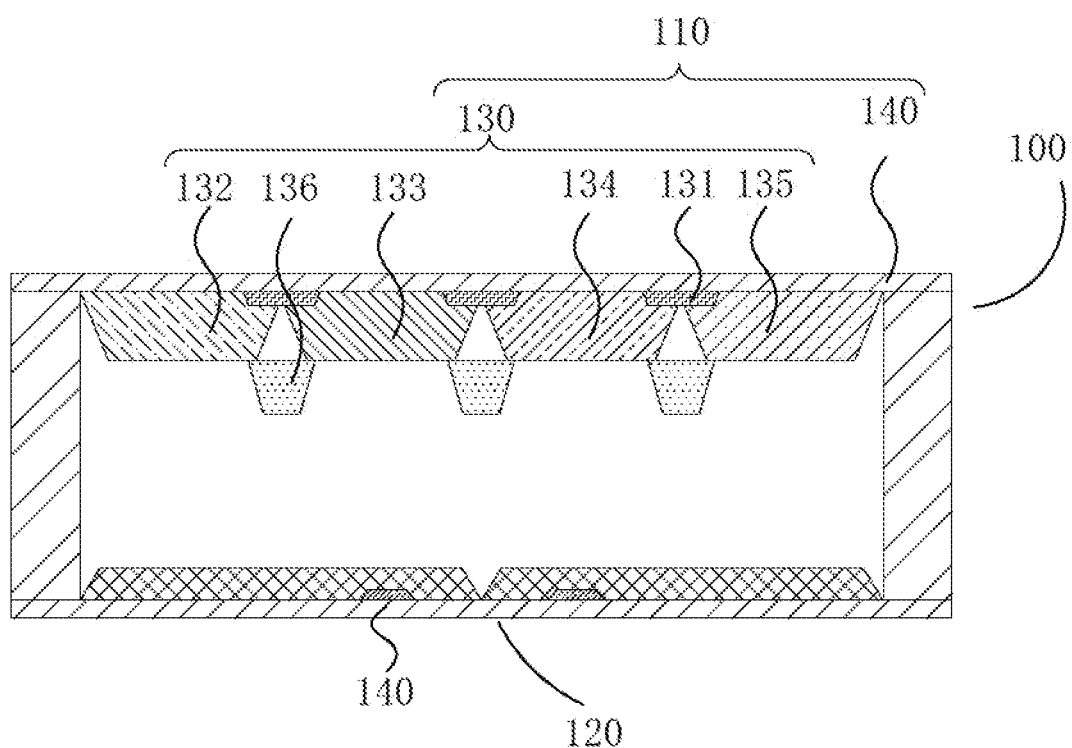
FIG. 6 is a schematic diagram of a display panel according to an embodiment of this application.
Figure 7:
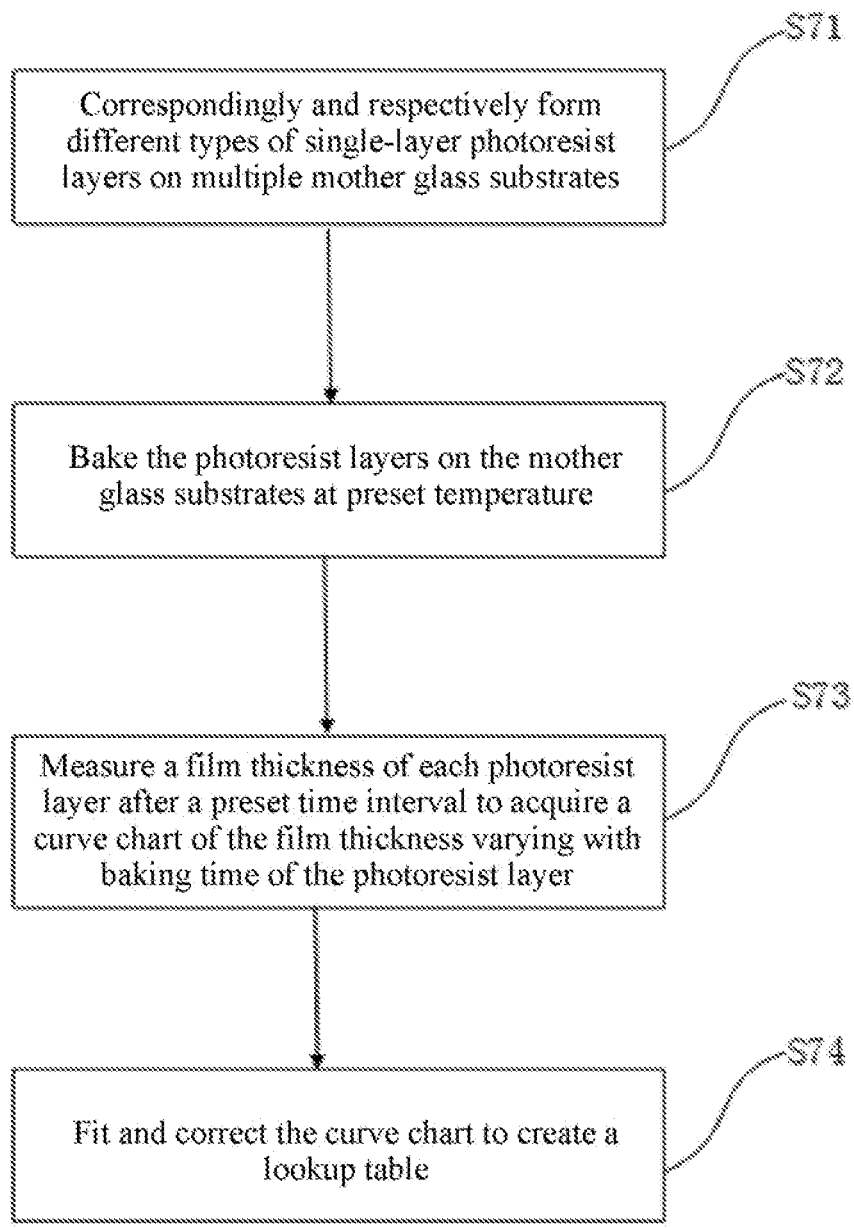
FIG. 7 is a flowchart of a lookup table creation method according to an embodiment of this application.
Figure 9:
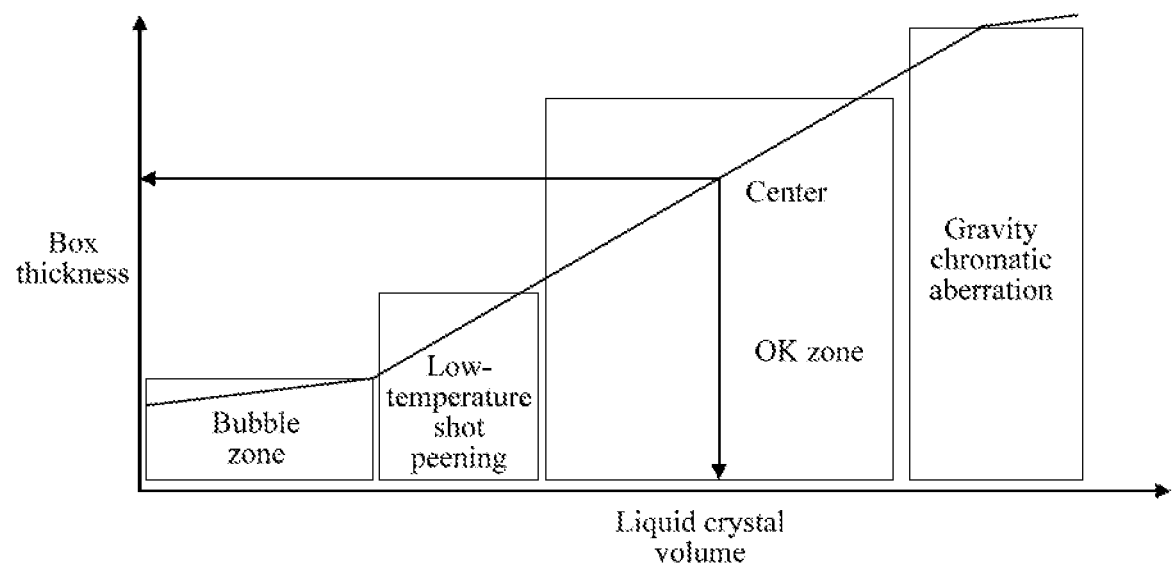
FIG. 9 is a relationship diagram between box thickness and the liquid crystal volume according to an embodiment of this application.

As shown in FIG. 1 to FIG. 7 and FIG. 9, an embodiment of this application discloses a lookup table creation method, the creation method including:

S71: Correspondingly and respectively form different types of single-layer photoresist layers 130 on multiple mother glass substrates 140.

S72: Bake the photoresist layers 130 on the mother glass substrates 140 at preset temperature.

S73: Measure a film thickness of each photoresist layer 130 after a preset time interval to acquire a curve chart of the film thickness varying with baking time of the photoresist layer 130.

S74: Fit and correct the curve chart to create a lookup table.

In this solution, the different types of single-layer photoresist layers 130 are respectively formed on the multiple mother glass substrates 140 to facilitate accurate calculation of the film thickness after baking; each photoresist layer 130 on each mother glass substrate 140 is baked at the preset temperature to ensure that each photoresist layer 130 is baked within same time to guarantee the accurate calculation of the film thickness; the film thickness of the photoresist layer 130 is measured after the preset time interval to acquire the curve chart of the film thickness varying with the baking time of the photoresist layer 130; the curve chart is fitted and corrected to create the lookup table; and a variation of the film thickness of the substrate may be effectively found out according to the lookup table, and then a box thickness of a display panel 100 is calculated to correspondingly calculate the drop-in volume of the liquid crystals, thus solving the bubble or chromatic aberration problem of the display panel 100.

In this embodiment, optionally, the preset time includes a first preset time and a second preset time, and a method for measuring a film thickness of each photoresist layer 130 after a preset time interval to acquire a curve chart of the film thickness varying with baking time of the photoresist layer 130 includes:

baking each photoresist layer 130 in a baking oven for the first preset time;

after cooling, measuring the film thickness of the photoresist layer 130;

putting the photoresist layer 130 into the baking oven for baking after the measurement is completed;

measuring the film thickness of the photoresist layer 130 once every second preset time; and acquiring the curve chart of the film thickness varying with the baking time of the photoresist layer 130.

In this solution, the preset time interval includes the first preset time and the second preset time. After the photoresist layer 130 is baked in the baking oven for the first preset time and then cooled, the film thickness of the photoresist layer 130 is measured, so as to ensure that the measured film thickness is an accurate measured value and prevent an error caused by thermal expansion and cold contraction. After the measurement is completed, the photoresist layer 130 is put into the baking oven again for baking, and the film thickness of the photoresist layer 130 is measured once every second preset time after the photoresist layer 130 is cooled. After the film thickness is measured for multiple times, the curve chart of the film thickness varying with the baking time of the photoresist layer 130 is acquired. Through multiple times of baking, the variation of the film thickness may be accurately obtained, so that the box thickness of the display panel 100 is calculated conveniently, and the drop-in volume of liquid crystals is calculated accurately.

In this embodiment, optionally, the first preset time is equal to the baking time of the photoresist layer in a manufacture procedure of the display panel 100. The first preset time is between 20 min and 60 min, and the second preset time is longer than 3 min.

In this solution, the first preset time is equal to the baking time of the photoresist layer in the manufacture procedure of the display panel 100, namely, the baking time of the photoresist layer in the manufacture procedure of the display panel 100 is the first preset time. As different photoresist layers have different baking time, and different types of display panels have different requirements for the film thickness and correspondingly require different baking time, so that as the first preset time ranges between 20 min and 60 min, and the second preset time is longer than 3 min, variations of the film thicknesses of different photoresist layers at different time may be obtained, and thickness values are obtained favorably by looking up the table.

In this embodiment, optionally, the first preset time may be set to be 24 min, and the second preset time may be set to be 6 min.

In this solution, the first preset time is 24 min, and the second preset time is 6 min. The two preset time lengths are optional baking time lengths, and the formation of photoresist in the manufacture procedure of the display panel 100 is completed gradually, so that the photoresist formed at first would be baked for 24 min for several times. Therefore, the second preset time for baking the photoresist layer 130 in this solution is 6 min. The corresponding variation of the film thickness is easy to find as 24 is a multiple of 6.

In this embodiment, optionally, a method for correspondingly and respectively forming different types of single-layer photoresist layers 130 on the multiple mother glass substrates 140 includes:

respectively coating the multiple mother glass substrates 140 with different types of single-layer photoresist material layers: and performing a mask manufacture procedure on the photoresist material layers by adopting a corresponding preset mask to form the photoresist layers 130.

In this solution, the multiple mother glass substrates 140 are respectively coated with the different types of photoresist materials, so that the thickness of the photoresist may be detected accurately, and such a phenomenon of failure of accurately measuring the variation of the photoresist material along with the baking time due to the fact of coating the same glass substrate 140 with multiple layers of photoresist layers is prevented. In the actual manufacture procedure of the display panel 100, the mask manufacture procedure is used, so that one mask manufacture procedure is added for each photoresist layer 130 in order to obtain the accurate film thickness value, so as to reduce a measurement error of the film thickness.

In this embodiment, optionally, the preset mask is the same one as that for the photoresist layers in the manufacture procedure of the display panel 100.

In this solution, the same preset mask is adopted to perform the mask manufacture procedure. As the film thickness is obtained by averaging multiple detected values, the same mask is required to be adopted for the manufacture procedure of the mask to reduce the influence caused by variables, and an accurate measured value of the film thickness is obtained conveniently to farther calculate the box thickness of the display panel 100.

In this embodiment, optionally, the preset temperature is equal to the baking temperature of the photoresist layers in the manufacture procedure of the display panel 100. The preset temperature is between 220° C. and 260° C.

In this solution, as different photoresist layers require different baking temperatures, and different types of display panels have different requirements for the film thickness and correspondingly require different baking temperatures, the different baking temperatures between 220° C. and 260° C. may enable different photoresist layers to reach relatively appropriate baking temperatures and may fully bake the photoresist layers 130. Furthermore, the actual baking temperatures within this range may reduce an error caused by the temperature and enable the film thicknesses of the photoresist layers 130 to be measured more conveniently, so that the box thickness of the display panel 100 is calculated conveniently and accurately, and then the drop-in volume of the liquid crystals is calculated accurately, so as to prevent the bubble or chromatic aberration problem of the display panel 100.

In this embodiment optionally, the preset temperature may be 230° C.

In this solution, the optional baking temperature is 230° C., and the actual manufacture procedure of the display panel 100 is performed at 230° C., so that the adoption of the actual baking temperature of the display panel 100 may reduce the error caused by the temperature and enable the film thicknesses of the photoresist layers 130 to be measured more conveniently, so that the box thickness of the display panel 100 is calculated conveniently and accurately, and then the drop-in volume of the liquid crystals is calculated accurately, so as to prevent the bubble or chromatic aberration problem of the display panel 100.

In this embodiment, optionally, the photoresist layers 130 include a black matrix photoresist layer 131, a red photoresist layer 132, a green photoresist layer 133, a blue photoresist layer 134, a white photoresist layer 135 and a spacer unit photoresist layer 136.

In this solution, the photoresist layers 130 include the black matrix photoresist layer 131, the red photoresist layer, the green photoresist layer 133, the blue photoresist layer 134, the white photoresist layer 135 and the spacer unit photoresist layer 136. In the manufacture procedure of the display panel 100, the multiple photoresist layers 130 are all detected, and the film thickness of each photoresist layer 130 is measured conveniently and accurately, so that the box thickness of the display panel 100 is calculated accurately, and then the drop-in volume of the liquid crystals is calculated accurately, so as to prevent the bubble or chromatic aberration problem of the display panel 100 due to the drop-in volume of the liquid crystals.

Figure 8:
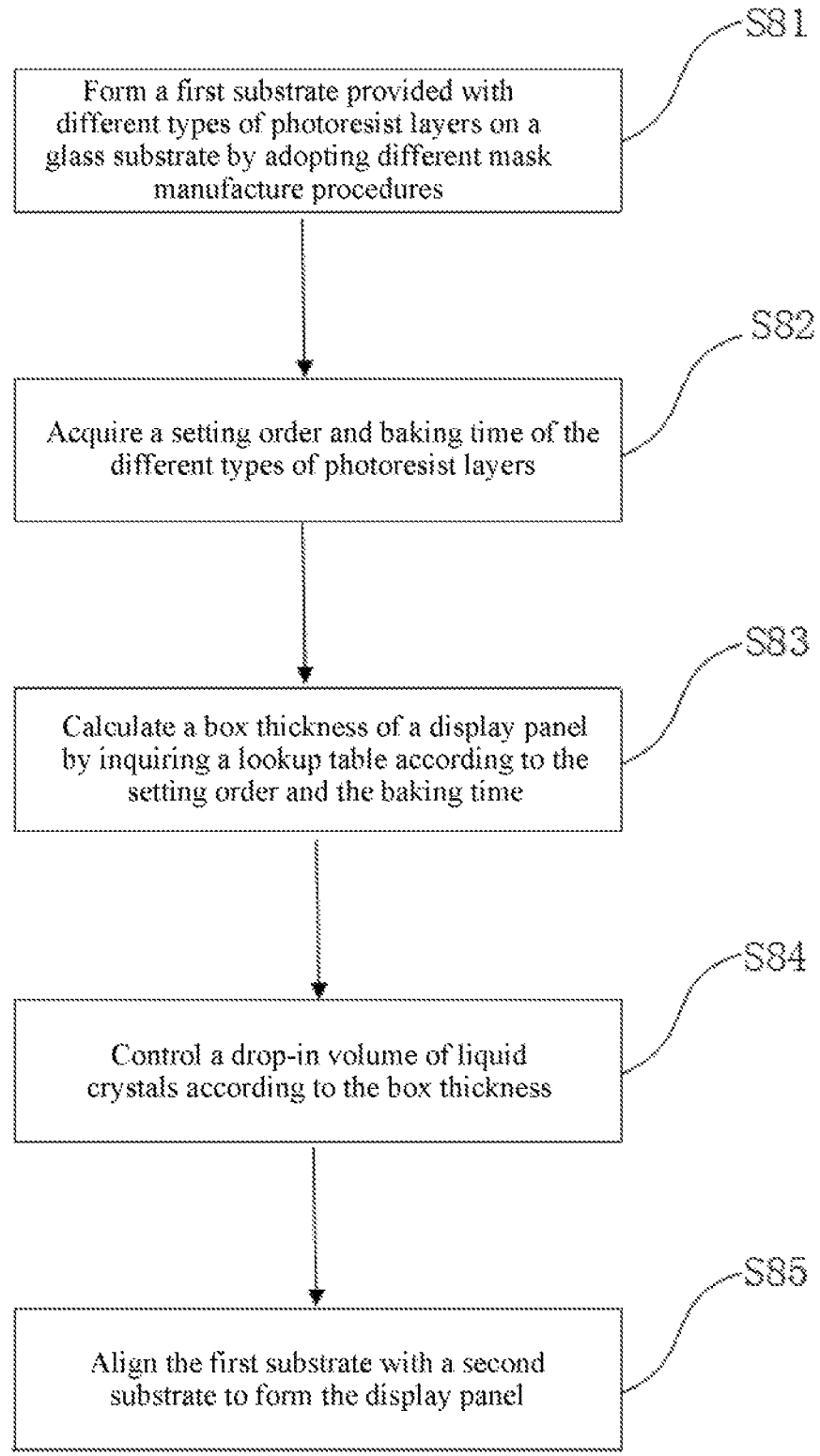
FIG. 8 is a flowchart of a display panel manufacturing method according to an embodiment of this application.

Referring to FIG. 1 to FIG. 6, FIG. 8 and FIG. 9, another embodiment of this application discloses a manufacturing method of a display panel 100, which adopts the above-mentioned created lookup table, the method including:

S81: Form a first substrate 110 provided with different types of photoresist layers 130 on a mother glass substrate 140 by adopting different mask manufacture procedures.

S82: Acquire a setting order and baking time of the different types of photoresist layers 130.

S83: Calculate a box thickness of the display panel 100 by inquiring a lookup table according to the setting order and the baking time.

S84: Control a drop-in volume of liquid crystals according to the box thickness.

S85: Align the first substrate 110 with a second substrate 120 to form the display panel 100.

In this solution, the manufacturing method of the display panel 100 includes that the setting order and the baking time of the different types of photoresist layers 130 are acquired to conveniently find out the film thicknesses at different baking time, then the box thickness of the display panel 100 is calculated, and the drop-in volume of the liquid crystals is controlled according to the box thickness of the display panel 100, so as to reduce the bubble or chromatic aberration problem of the display panel 100 due to the drop-in volume of the liquid crystals.

In this embodiment, optionally, a method for calculating the box thickness of the display panel 100 according to the setting order and the baking time includes:

calculating total baking time of each photoresist layer 130 according to the setting order and the baking time;

correspondingly inquiring the lookup table according to the total baking time of each photoresist layer 130 to acquire a film thickness of each photoresist layer 130; and calculating the box thickness of the display panel 100 according to the film thickness of each photoresist layer 130.

In this solution, the manufacturing method of the display panel 100 includes that the baking time of each photoresist layer 130 is calculated according to the setting order and the baking time of the photoresist layers 130, the thickness of each layer of photoresist is correspondingly found out according to the baking time, and the box thickness of the display panel 100 is calculated according to the thickness of the photoresist, thus the drop-in volume of the liquid crystals may be calculated, and manufacturing of the display panel 100 is completed.

Referring to FIG. 1 to FIG. 9, another embodiment of this application discloses a display device, including a control component, and a display panel 100 produced by adopting the above-mentioned manufacturing method of the display panel 100.

In this solution, the display device includes the control component. The baking time and the corresponding film thickness of each photoresist layer 130 are found out according to a lookup table, and then the box thickness of the display panel 100 is calculated accurately, so as to calculate the drop-in volume of the liquid crystals, reduce the bubble or chromatic aberration problem of the display panel 100 due to the liquid crystals, solve the quality problem of the display panel 100 and increase the manufacturing yield of the display panel 100.

The display panel of this application may be a twisted nematic (TN) panel, an in-plane switching (WS) panel, or a vertical alignment (VA) panel, and may certainly be any other suitable type of panel.

The foregoing contents are detailed descriptions of this application in conjunction with specific optional embodiments, and it should not be considered that the specific implementation of this application is limited to these descriptions. Persons of ordinary skill in the art can further make simple deductions or replacements without departing from the concept of this application, and such deductions or replacements should all be considered as falling within the protection scope of this application.

What is claimed is:

1. A lookup table creation method, the creation method comprising:
    correspondingly and respectively forming different types of single-layer photoresist layers on multiple mother glass substrates;
    baking the photoresist layers on the mother glass substrates at preset temperature;
    measuring a film thickness of each photoresist layer after a preset time interval to acquire a curve chart of the film thickness varying with baking time of the photoresist layer; and
    fitting and correcting the curve chart to create a lookup table.

2. The lookup table creation method according to claim 1, wherein the preset time comprises a first preset time and a second preset time.

3. The lookup table creation method according to claim 2, wherein a method adapted to measuring a film thickness of each photoresist layer after a preset time interval to acquire a curve chart of the film thickness varying with baking time of the photoresist layer comprises:
    baking each photoresist layer in a baking oven for the first preset time;
    after cooling, measuring the film thickness of the photoresist layer;
    putting the photoresist layer into the baking oven for baking after the measurement is completed;
    measuring the film thickness of the photoresist layer once every second preset time; and
    acquiring the curve chart of the film thickness varying with the baking time of the photoresist layer.

4. The lookup table creation method according to claim 3, wherein the first preset time is equal to the baking time of the photoresist layer in a manufacture procedure of a display panel, the first preset time is between 20 min and 60 min, and the second preset time is longer than 3 min.

5. The lookup table creation method according to claim 4, wherein that the first preset time is set to be 24 min, and the second preset time is set to be 6 min.

6. The lookup table creation method according to claim 1, wherein a method for correspondingly and respectively forming different types of single-layer photoresist layers on multiple mother glass substrates comprises:
respectively coating the multiple mother glass substrates with different types of single-layer photoresist material layers; and
performing a mask manufacture procedure on the photoresist material layers by adopting a corresponding preset mask to form the photoresist layers.

7. The lookup table creation method according to claim 4, wherein the preset mask is the same one as that for the photoresist layers in the manufacture procedure of the display panel.

8. The lookup table creation method according to claim 1, wherein the preset temperature is equal to the baking temperature of the photoresist layers in the manufacture procedure of the display panel, and the preset temperature is between 220° C. and 260° C.

9. The lookup table creation method according to claim 1, wherein the preset temperature is set to be 230° C.

10. The lookup table creation method according to claim 1, wherein the photoresist layers comprise a black matrix photoresist layer, a red photoresist layer, a green photoresist layer, a blue photoresist layer, a white photoresist layer and a spacer unit photoresist layer.

11. A display panel manufacturing method, which adopts a lookup table created by adopting the lookup table creation method, the method comprising:
forming a first substrate provided with different types of photoresist layers on a glass substrate by adopting different mask manufacture procedures;
acquiring a setting order and baking time of the different types of photoresist layers;
calculating a box thickness of a display panel according to the setting order and the baking time;
controlling a drop-in volume of liquid crystals according to the box thickness; and
aligning the first substrate with a second substrate to form the display panel.

12. The display panel manufacturing method according to claim 11, wherein a method for forming a first substrate provided with different types of photoresist layers on a glass substrate by adopting different mask manufacture procedures comprises:
respectively coating multiple mother glass substrates with different types of single-layer photoresist material layers; and
performing the mask manufacture procedures on the photoresist material layers by adopting corresponding masks to form the photoresist layers.

13. The display panel manufacturing method according to claim 11, wherein a method for calculating a box thickness of a display panel according to the setting order and the baking time comprises:
calculating total baking time of each photoresist layer according to the setting order and the baking time;
correspondingly inquiring the lookup table according to the total baking time of each photoresist layer to acquire a film thickness of each photoresist layer; and
calculating the box thickness of the display panel according to the film thickness of each photoresist layer.

14. The display panel manufacturing method according to claim 11, wherein the baking time is between 20 min and 60 min.

15. The display panel manufacturing method according to claim 11, wherein the photoresist layers comprise a black matrix photoresist layer, a red photoresist layer, a green photoresist layer, a blue photoresist layer, a white photoresist layer and a spacer unit photoresist layer.

* * * * *